US012649241B1

(12) United States Patent
Zheng et al.

(10) Patent No.: US 12,649,241 B1
(45) Date of Patent: Jun. 9, 2026

(54) CALIBRATION METHOD APPLIED TO MOBILE ROBOT, CONTROLLER, AND MOBILE ROBOT

(71) Applicant: VisionNav Robotics USA Inc., Acworth, GA (US)

(72) Inventors: Fan Zheng, Acworth, GA (US); Yujie Lu, Acworth, GA (US); Feng Zhang, Acworth, GA (US)

(73) Assignee: VISIONNAV ROBOTICS USA INC., Acworth, GA (US)

( * ) Notice: Subject to any disclaimer, the term of this patent is extended or adjusted under 35 U.S.C. 154(b) by 0 days.

(21) Appl. No.: 19/187,062

(22) Filed: Apr. 23, 2025

(51) Int. Cl.
*B25J 9/16* (2006.01)
*B25J 5/00* (2006.01)

(52) U.S. Cl.
CPC ............. *B25J 9/1692* (2013.01); *B25J 5/007* (2013.01); *B25J 9/1607* (2013.01); *B25J 9/1661* (2013.01)

(58) Field of Classification Search
CPC ........ B25J 9/1692; B25J 5/007; B25J 9/1607; B25J 9/1661; G05D 1/02; G05D 1/43; G01S 7/4972; G01S 17/931; G01S 17/88; G01S 17/86; G06T 7/80; G06T 7/70; G01C 21/00; G01C 21/005; G01C 21/3841; G01C 21/3833; G01C 21/28; G01C 21/1652; G01C 21/165; G01C 21/206
See application file for complete search history.

(56) References Cited

U.S. PATENT DOCUMENTS 10,176,596 B1 * 1/2019 Mou ...................... G01S 17/931
10,395,117 B1 * 8/2019 Zhang .................... G06V 20/58

10,937,231 B2 * 3/2021 Yang .......................... G06T 7/85
11,199,614 B1 * 12/2021 Gan ......................... G01S 17/42
2020/0109954 A1 * 4/2020 Li ....................... G01C 21/3848
2022/0066002 A1 * 3/2022 Abari .................... G01S 17/931
2022/0194412 A1 * 6/2022 Zhang ................ B60W 60/001
2023/0266451 A1 * 8/2023 Hu ......................... G01S 7/4808
356/4.01
2024/0337747 A1 * 10/2024 Bennehar ................ G01S 7/497

FOREIGN PATENT DOCUMENTS

CN 117665778 A * 3/2024 ........... G01S 17/931

OTHER PUBLICATIONS

Translation of CN-117665778-A (Year: 2024).*

* cited by examiner

*Primary Examiner* — Adam R Mott
*Assistant Examiner* — James Miller Watts, III
(74) *Attorney, Agent, or Firm* — MUNCY, GEISSLER, OLDS & LOWE, P.C.

(57) ABSTRACT

A calibration method applied to a mobile robot, a controller, and a mobile robot. The calibration method includes: driving the mobile robot to perform a corresponding preset movement task according to at least one preset movement trajectory; determining, in response to the mobile robot performing the corresponding preset movement task, whether sensing information of a sensor assembly satisfies a preset condition; and performing body coordinate calibration on the sensor assembly and the mobile robot in response to the sensing information of the sensor assembly satisfying the preset condition, the performing body coordinate calibration on the sensor assembly and the mobile robot at least including: obtaining a transformation matrix between at least two sensors in the sensor assembly; and determining an abnormal value in the transformation matrix and discarding the abnormal value.

16 Claims, 15 Drawing Sheets

131

1313

132

CALIBRATION METHOD APPLIED TO MOBILE ROBOT, CONTROLLER, AND MOBILE ROBOT

TECHNICAL FIELD

The present disclosure relates to the field of mobile robots, and specifically, to a calibration method applied to a mobile robot, a controller, and a mobile robot.

BACKGROUND

To implement functions such as autonomous movement and obstacle avoidance, various sensors are usually arranged on a body of a mobile robot. Conventionally, to sense an environment, build a map, and detect an object, the mobile robot can use a 3-dimensional (3D) laser sensor to perform related sensing operations. A relative positional relationship between the 3D laser sensor and a body center can directly affect the accuracy of sensed data, environment modeling, and the navigation capability. However, the relative positional relationship between the 3D laser sensor and the body center mainly depends on three-dimensional mechanical mapping measurement. As a result, a deviation easily occurs in actual vehicle machining and vehicle assembling processes. In addition, if the relative positional relationship relies on manual measurement, data of each axis can only be roughly measured, so that the data cannot meet a high-accuracy requirement, and it is hard to measure an angle. If measurement depends on professional equipment, the operation costs can be increased.

BRIEF DESCRIPTION OF THE DRAWINGS

The accompanying drawings are intended to provide a further understanding of the present disclosure and constitute a part of this specification. The accompanying drawings and specific implementations below are used together for explaining the present disclosure rather than constituting a limitation on the present disclosure. In the accompanying drawings.

DETAILED DESCRIPTION

Figure 1A:
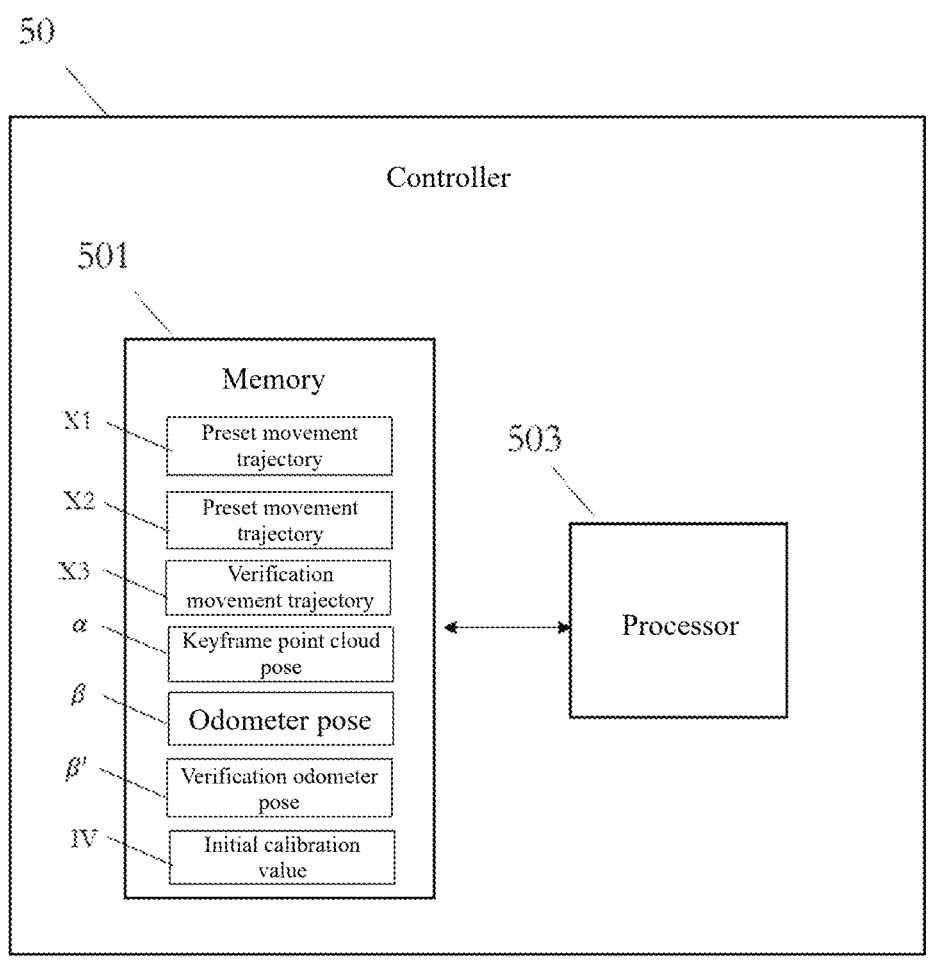
FIG. 1A is a schematic block diagram of a controller according to an embodiment of the present disclosure.

The following disclosure provides various implementations or examples, which can be used to implement different features of the present disclosure. Specific examples of components and configurations described below are used to simplify the present disclosure. It can be conceived that these descriptions are merely for exemplary purposes, and are not intended to limit the present disclosure. For example, in the following description, a first feature is formed on or above a second feature, which may include some embodiments in which the first feature and the second feature are in direct contact with each other. In addition, some embodiments may alternatively be included that an additional component is formed between the first feature and the second feature, so that the first feature and the second feature may not be in direct contact. In addition, in content of the present disclosure, component symbols and/or numbers may be repeatedly used in a plurality of embodiments. The repeated use is for brevity and clarity, and does not represent a relationship between different discussed embodiments and/or configurations.

In addition, relative spatial terms used herein, such as "below", "under", "above", "over", and the like, may be used for ease of describing a relationship between one component or feature shown in the figure and another component or feature. These relative spatial terms are intended to cover multiple different orientations of an apparatus during use or operation in addition to orientations shown in the figures. The device may be placed at another orientation (for example, rotated by 90 degrees or at another orientation), and these relative spatial description terms should be correspondingly interpreted.

Although numerical ranges and parameters that are used to define a broad scope of the present disclosure are approximate values, relevant values in specific embodiments are presented as precisely as possible herein. However, any value essentially inevitably contains a standard deviation caused by an individual test method. Here, "about" usually means that an actual value is within plus or minus 10%, 5%, 1%, or 0.5% of a particular value or range. Alternatively, the term "about" represents that an actual value falls within an acceptable standard error of an average value, and is determined by consideration of a person of ordinary skill in the art to which the present disclosure belongs. It may be understood that, except experimental examples, or unless otherwise clearly stated, all ranges, amounts, values, and percentages used herein (for example, for describing an amount of a material, a time length, a temperature, an operating condition, a quantity ratio, and the like) are modified by "about". Therefore, unless otherwise specified to the contrary, numerical parameters disclosed in this specification and appended claims are approximate values, and may be changed according to requirements. These numerical parameters should be at least understood as specified valid digits and numerical values obtained by using a common carrying method. Here, a value range is represented to be from one endpoint to another endpoint or between two endpoints. Unless otherwise specified, the value range described here includes the endpoints.

To implement functions such as autonomous movement and obstacle avoidance, various sensors are usually arranged on a body of a mobile robot. Conventionally, to sense an environment, build a map, and detect an object, the mobile robot can use a 3-dimensional (3D) laser sensor to perform related sensing operations. A relative positional relationship between the 3D laser sensor and a body center can directly affect the accuracy of sensed data, environment modeling, and the navigation capability. However, the relative positional relationship between the 3D laser sensor and the body center mainly depends on three-dimensional mechanical mapping measurement. As a result, a deviation easily occurs in actual vehicle machining and vehicle assembling processes. In addition, if the relative positional relationship relies on manual measurement, data of each axis can only be roughly measured, so that the data cannot meet a high-accuracy requirement, and it is hard to measure an angle. If measurement depends on professional equipment, the operation costs can be increased.

In view of this, the present disclosure provides a calibration method applied to a mobile robot, a controller, and a mobile robot. The mobile robot is a robot that can autonomously or controllably move in an environment. Common forms include: an automated guided vehicle (AGV), an autonomous mobile robot (AMR), a humanoid robot, and the like, or another form such as a robot vacuum cleaner.

FIG. 1A is a schematic block diagram of a controller 50 according to an embodiment of the present disclosure. In some embodiments, the controller 50 includes a memory 501 and a processor 503. In some embodiments, the processor 503 is operatively coupled to the memory 501. In some embodiments, the processor 503 may be an integrated element. The processor 503 may be composed of a plurality of processing units. The processor 503 may include a computing unit or a core computing unit. The processor 503 may be configured to load data information from the memory 501. The processor 503 may store the data information to the memory 501. The processor 503 can receive data from other hardware devices. The processor 503 may process data from the other hardware devices.

In some embodiments, the memory 501 may be an integrated element. The memory 501 may be considered as being composed of a plurality of storage units. Information such as, but not limited to, data information such as a point cloud path, a pose, and a key frame may be respectively stored in different storage units or stored in the same storage unit.

Figure 1B:
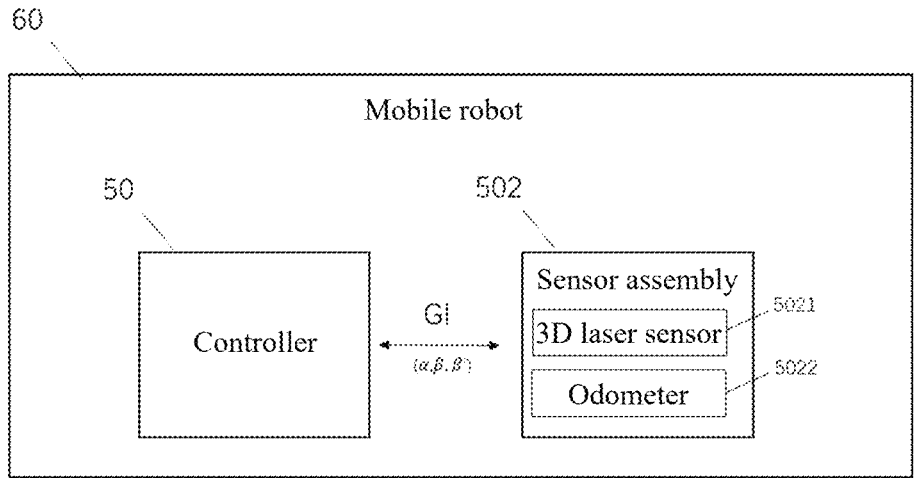
FIG. 1B is a schematic block diagram of a mobile robot according to an embodiment of the present disclosure.

FIG. 1B is a schematic block diagram of a mobile robot 60 according to an embodiment of the present disclosure. In some embodiments, the mobile robot 60 includes the controller 50 shown in FIG. 1 and a sensor assembly 502. In some embodiments, the controller 50 is operatively coupled to the sensor assembly 502. In some embodiments, the controller 50 cooperates with the sensor assembly 502 to implement the calibration method provided in the present disclosure. In some embodiments, the controller 50 may be a plug and play apparatus. In some embodiments, the controller 50 may be connected to the mobile robot 60 in a wired or wireless manner. In some embodiments, the sensor assembly 502 is an integrated element. The sensor assembly 502 may be considered as being composed of a plurality of sensor elements. In some embodiments, the sensor assembly 502 includes a 3D laser sensor 5021 and an odometer 5022. The sensor assembly 502 can further include other sensor elements to meet the operational requirements of the mobile robot.

Figure 1C:
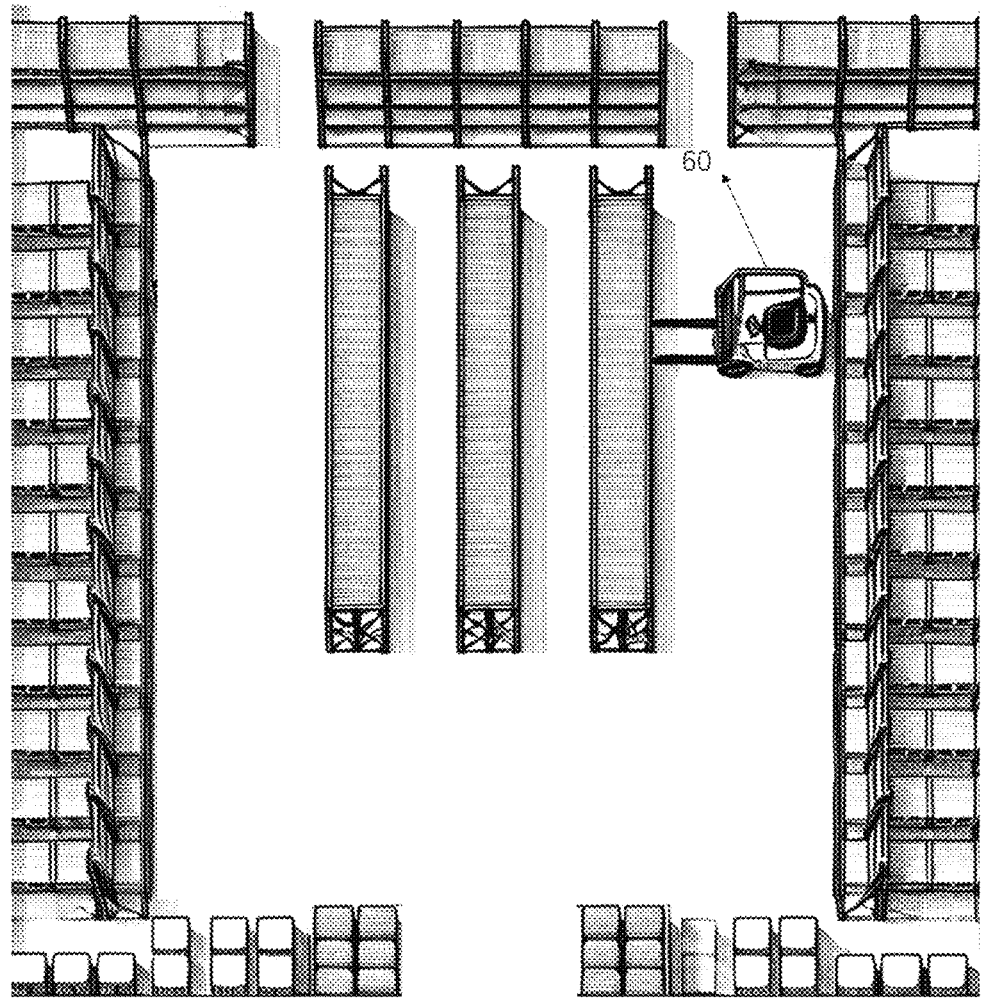
FIG. 1C is a schematic diagram of use of a mobile robot to a warehouse according to an embodiment of the present disclosure.

The mobile robot 60 in the embodiment of FIG. 1A may alternatively be an unmanned forklift applied to a warehouse. Referring to FIG. 1C, FIG. 1C is a schematic diagram of use of a mobile robot 60 to a warehouse according to an embodiment of the present disclosure. The mobile robot 60 may take goods from a warehouse region according to an instruction, precisely place the goods at a specified location, and dynamically plan a path according to real-time data with cooperation between the sensor assembly 502 and the controller 50, to avoid collision and improve the operating efficiency. It should be noted that the pattern of the mobile robot 60 shown in FIG. 1C is merely used for exemplary description, and is not a limitation on the present disclosure. In addition, the mobile robot 60 is not limited to being applied to an unmanned forklift. In other embodiment, the mobile robot 60 may be any intelligent mobile apparatus that includes a 3D laser sensor.

Figure 2:
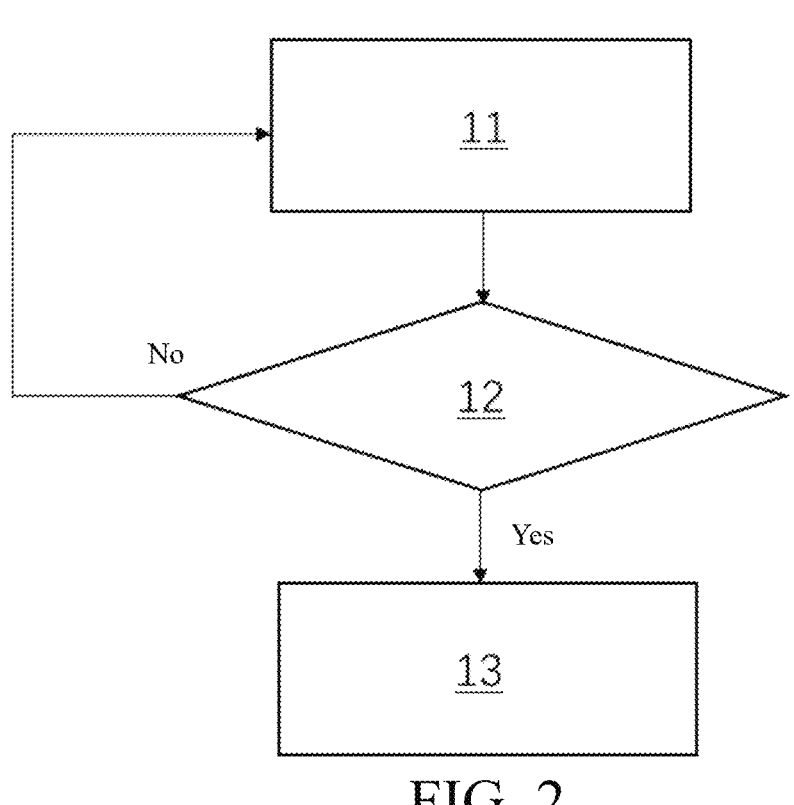
FIG. 2 is a method flowchart of a calibration method according to an embodiment of the present disclosure.

FIG. 2 is a method flowchart of a calibration method 10 according to an embodiment of the present disclosure. If approximately the same result can be obtained, the present disclosure is not limited to be performed according exactly to steps of the flowchart shown in FIG. 2. The calibration method 10 may be applied to the controller 50 shown in FIG. 1A and the mobile robot 60 shown in FIG. 1B. Subsequent embodiments will be illustrated using FIG. 1A and FIG. 1B as examples. In some embodiments, the steps of the calibration method 10 may be performed by different control units/processing units in the processor 503 or the same control unit/processing unit. In some embodiments, the calibration method 10 may include step 11, step 12, and step 13.

In some embodiments, in step 11, the processor 503 drives the mobile robot 60 to perform a corresponding preset movement task according to at least one preset movement trajectory. In some embodiments, in step 12, the processor 503 determines whether sensing information GI of the sensor assembly 502 satisfies a preset condition. If yes, step 13 is executed, otherwise, step 11 is executed. In some embodiments, in step 13, the processor 503 performs body coordinate calibration on the sensor assembly 502 and the mobile robot 60.

Figure 3:
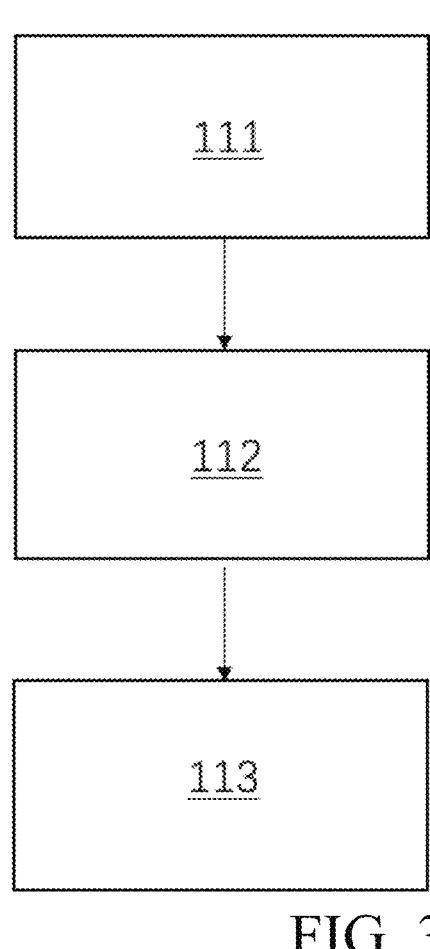
FIG. 3 is a detailed method flow of step 11 according to an embodiment of the present disclosure.

For a detailed explanation of step 11, refer to FIG. 3. FIG. 3 is a detailed method flow of step 11 according to an embodiment of the present disclosure. If approximately the same result can be obtained, the present disclosure is not limited to be performed according exactly to steps of the flow shown in FIG. 3. In some embodiments, step 11 may include step 111, step 112, and step 113.

In some embodiments, in step 111, the processor 503 loads the at least one preset movement trajectory. In some embodiments, the processor 503 loads two preset movement trajectories. The two preset movement trajectories respectively correspond to a straight trajectory and a curved trajectory. In some embodiments, the processor 503 loads one preset movement trajectory. The preset movement trajectory is any trajectory that includes a straight line and a curved line. It should be noted that the present disclosure does not limit types and quantities of loaded preset movement trajectories.

Subsequent embodiments will make an explanation by simultaneously loading two preset movement trajectories (i.e. preset movement trajectory X1 and preset movement trajectory X2).

In some embodiments, in step 112, the processor 503 drives the mobile robot 60 to move according to the two preset movement trajectories X1 and X2. In some embodiments, in step 113, the processor 503 drives the sensor assembly 502 to build a map when the mobile robot 60 moves according to preset movement trajectory X1 and preset movement trajectory X2, and obtains sensing information GI.

In some embodiments, preset movement trajectory X1 and preset movement trajectory X2 may be built in the memory 501 in advance when the mobile robot 60 leaves a factory. In some embodiments, the preset movement trajectories, such as preset movement trajectory X1 and preset movement trajectory X2, may be built in real time by a user when the mobile robot 60 performs the calibration method 10. For example, the user manually draws the preset movement trajectories in real time on site, or the user transmits the preset movement trajectories to the mobile robot 60 in a file transmission manner on site. In some embodiments, the preset movement trajectories, such as preset movement trajectory X1 and preset movement trajectory X2, may be built in real time by the processor 503 when the calibration method 10 is performed. However, in other embodiments, when the calibration method 10 is performed, the preset movement trajectories, for example, preset movement trajectory X1 and preset movement trajectory X2, may be transmitted to the mobile robot 60 through an external processing system arranged outside the mobile robot 60 to complete the loading. For example, an external processing system may be a robot control system (RCS) for controlling and performing instruction processing on the mobile robot 60.

Figure 4:
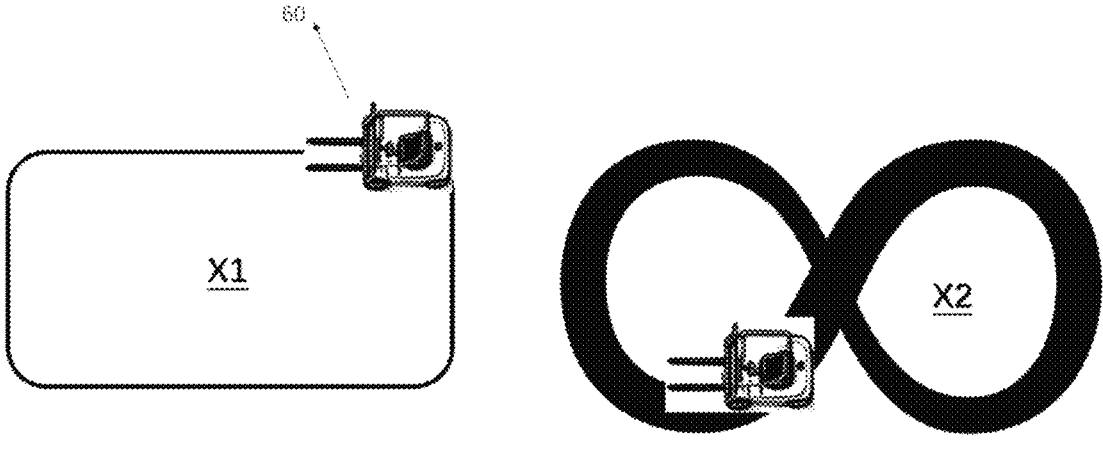
FIG. 4 is a schematic diagram of step 112 according to an embodiment of the present disclosure.

Referring to FIG. 4, FIG. 4 is a schematic diagram of a mobile robot moving according to preset movement trajectory X1 and preset movement trajectory X2 according to an embodiment of the present disclosure. In some embodiments, preset movement trajectory X1 may be a rectangular trajectory, and preset movement trajectory X2 may be a co-shaped trajectory. The mobile robot 60 moves according to preset movement trajectory X1 and preset movement trajectory X2. However, the present disclosure does not limit an actual pattern of a preset movement trajectory. In some embodiments, preset movement trajectory X1 and preset movement trajectory X2 may be any trajectory including a straight line, a curved line, or a combination.

In some embodiments, the sensing information GI includes a keyframe point cloud pose a sensed by the 3D laser sensor 5021 and an odometer pose β sensed by the odometer 5022. In some embodiments, the calibration method 10 uses the odometer 5022 as a reference coordinate system for a body center. In other embodiment, the calibration method 10 may use another sensor, such as a camera, an inertial measurement unit, a wheel speed sensor, a global positioning sensor (GPS), to replace the odometer.

Referring again to FIG. 2, in some embodiments, the preset condition in step 12 includes determining whether a frame number of a keyframe point cloud pose a sensed by the 3D laser sensor 5021 and a frame number of an odometer pose β sensed by the odometer 5022 are greater than a threshold. In some embodiments, the threshold ranges from 40 s to 80 s. In some embodiments, a keyframe may be determined based on time. For example, every unit of time (such as 1 second), the processor 503 uses data currently sensed by the 3D laser sensor 5021 as a keyframe. In other embodiment, a keyframe may be determined based on a distance or an angle of movement. This is not a limitation on the present disclosure.

In some embodiments, the processor 503 may determine in real time whether the frame number is greater than the threshold. For example, after a period of time (e.g. 20 seconds), the processor 503 determines that the frame number is greater than the threshold. In this case, regardless of whether the preset movement trajectory is completed, the processor 503 controls the mobile robot 60 to stop. On the contrary, as long as the frame number is less than the threshold, the processor 503 drives the mobile robot 60 to continue to move according to the preset movement trajectory.

Figure 5:
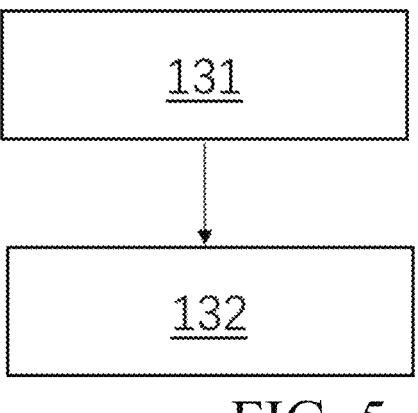
FIG. 5 is a detailed method flow of step 13 according to an embodiment of the present disclosure.

For a detailed explanation of step 13, refer to FIG. 5. FIG. 5 is a detailed method flow of step 13 according to an embodiment of the present disclosure. If approximately the same result can be obtained, the present disclosure is not limited to be performed according exactly to steps of the flow shown in FIG. 5. In some embodiments, step 13 may include step 131 and step 132.

In some embodiments, in step 131, the processor 503 obtains a transformation matrix X between at least two sensors in the sensor assembly 502, such as the 3D laser sensor 5021 and the odometer 5022. In some embodiments, in step 132, the processor 503 determines an abnormal value in the transformation matrix X and discard the abnormal value.

Figure 6:
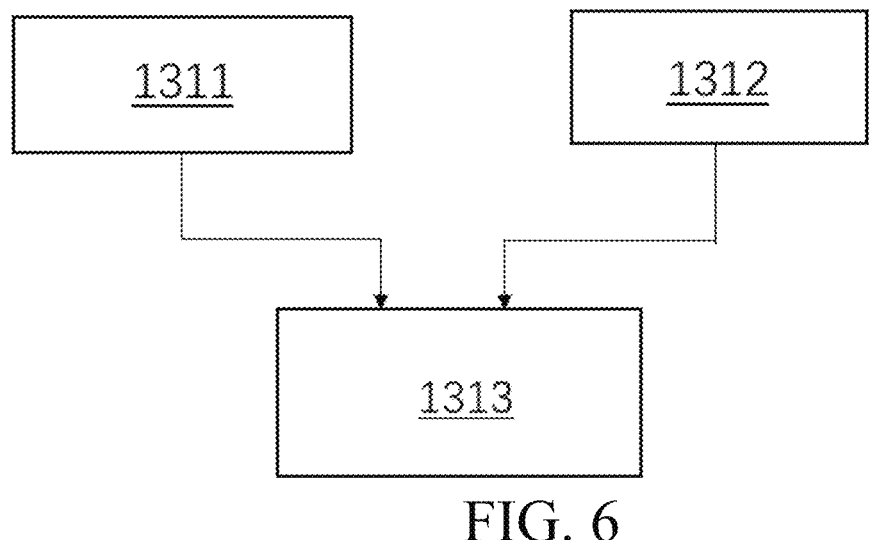
FIG. 6 is a detailed method flow of step 131 according to an embodiment of the present disclosure.

For a detailed explanation of step 131, refer to FIG. 6. FIG. 6 is a detailed method flow of step 131 according to an embodiment of the present disclosure. If approximately the same result can be obtained, the present disclosure is not limited to be performed according exactly to steps of the flow shown in FIG. 6. In some embodiments, step 131 may include step 1311, step 1312, and step 1313.

In some embodiments, in step 1311, the processor 503 obtains the keyframe point cloud pose a and the odometer pose β and stores the keyframe point cloud pose and the odometer pose in the memory 501. In some embodiments, in step 1312, the processor 503 obtains an initial calibration value IV. In some embodiments, in step 1313, the processor 503 calculates a transformation matrix X between the 3D laser sensor 5021 and the odometer 5022 based on the initial calibration value IV, the keyframe point cloud pose a, and the odometer pose β.

In some embodiments, the initial calibration value IV is a numerical parameter that has been stored in the memory 501 when the mobile robot 60 leaves the factory. The initial calibration value IV is determined based on a relative positional relationship between the 3D laser sensor 5021 and a body center of the mobile robot when the mobile robot leaves the factory. In some embodiments, the initial calibration value IV may include parameters such as a distance Lx on an X axis, a distance Ly on a Y axis, a distance Lz on a Z axis, a roll angle, a pitch angle, and a yaw angle, and be represented as a set of these parameters. In some embodiments, the initial calibration value IV is used as an initial value of the transformation matrix X between the keyframe point cloud pose a and the odometer pose B.

Figure 7:
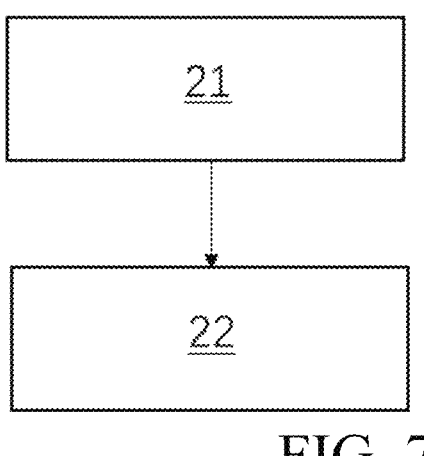
FIG. 7 is a detailed method flow of step 1313 according to an embodiment of the present disclosure.

For a detailed explanation of step 1313, refer to FIG. 7. FIG. 7 is a detailed method flow of step 1313 according to an embodiment of the present disclosure. If approximately the same result can be obtained, the present disclosure is not limited to be performed according exactly to steps of the flow shown in FIG. 7. In some embodiments, step 1313 may include step 21 and step 22.

In some embodiments, in step 21, the processor 503 loads keyframe point cloud poses a and odometer poses β of all frames from the memory 501. In some embodiments, in step 22, the processor 503 performs hand-eye calibration on the keyframe point cloud poses a and odometer poses β of all the frames to obtain the transformation matrix X between the 3D laser sensor 5021 and the odometer 5022.

Figure 8:
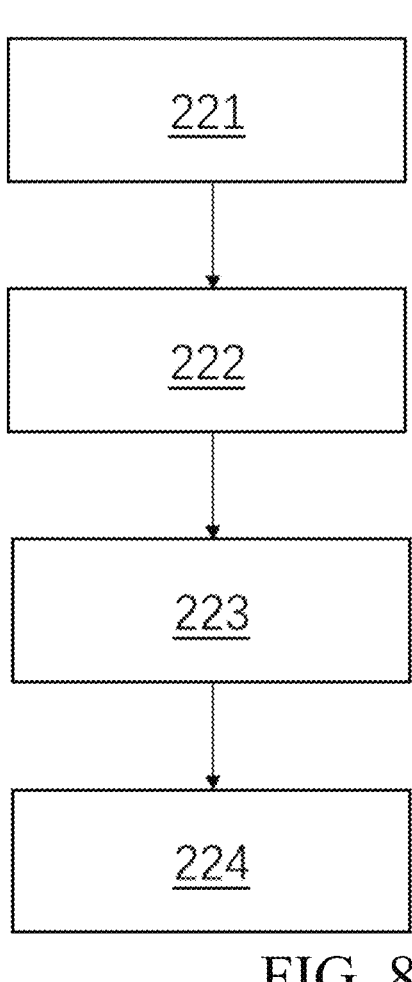
FIG. 8 is a detailed method flowchart of step 22 according to an embodiment of the present disclosure.

For a detailed explanation of step 22, refer to FIG. 8. FIG. 8 is a detailed method flowchart of step 22 according to an embodiment of the present disclosure. If approximately the same result can be obtained, the present disclosure is not limited to be performed according exactly to steps of the flow shown in FIG. 8. In some embodiments, step 22 may include step 221, step 222, step 223, and step 224.

In some embodiments, in step 221, the processor 503 extracts pose matrixes $\alpha_i$ and $\beta_i$ for each frame from the keyframe point cloud poses a and odometer poses β of all the frames (e.g. n frames). In some embodiments, in step 222, the processor 503 calculates a relative pose two adjacent frames and constructs $$A_i = a_i^{-1} a_{i+1}$$

and $$B_i = \beta_i^{-1} \beta_{i+1},$$

where $$a_i^{-1}$$

is an inverse matrix of the pose matrix $\alpha_i$, and $$\beta_i^{-1}$$

is an inverse matrix of the pose matrix β. In some embodiments, in step 223, the processor 503 substitutes $A_i$ and $B_i$ of an n−1 group into an equation AX=XB and constructs an error function. In some embodiments, the error function may be expressed as $$\min_X \sum_{i=1}^{n-1} \|A_i X - X B_i\|_F^2.$$

In some embodiments, in step 224, the processor 503 uses a numerical optimization method to minimize the error function and obtain the transformation matrix X.

Figure 9:
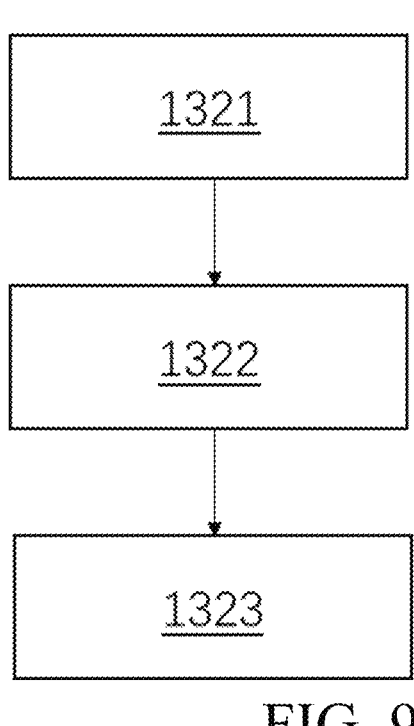
FIG. 9 is a detailed method flow of step 132 according to an embodiment of the present disclosure.

Referring again to FIG. 5, for a detailed explanation of step 132, refer to FIG. 9. FIG. 9 is a detailed method flow of step 132 according to an embodiment of the present disclosure. If approximately the same result can be obtained, the present disclosure is not limited to be performed according exactly to steps of the flow shown in FIG. 9. In some embodiments, step 132 may include step 1321, step 1322, and step 1323.

In some embodiments, in step 1321, the processor 503 calculates a residual of the n−1 group (A and B). In some embodiments, in step 1322, the processor 503 eliminates (A and B) corresponding to a residual that is greater than the threshold. In some embodiments, in step 1323, the processor 503 calculates a transformation matrix X again according to reserved (A and B). In step 1323, the finally obtained transformation matrix X is used as a calibration result. In some embodiments, the threshold is a distance threshold, and ranges from 3 cm to 12 cm. In some embodiments, the threshold is an angle threshold, and ranges from 1 to 12°.

The sensor assembly 502 may have a phenomenon such as jump and frame loss due to data pollution during sensing, polluted data may be cleaned through step 132. During calculation of the transformation matrix X, the processor 503 discards the data if the calculated transformation matrix X has a large deviation relative to a historically calculated matrix.

Figure 10:
FIG. 10 is a method flowchart of a calibration method according to an embodiment of the present disclosure.
Figure 10:
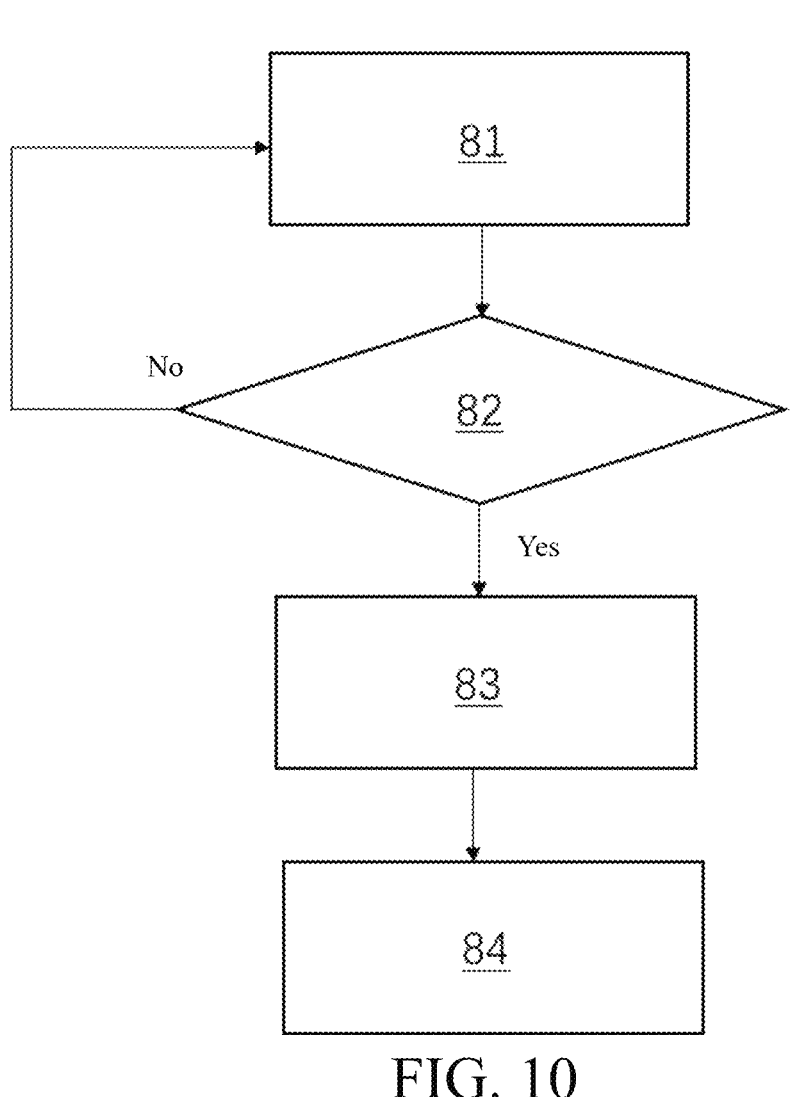

FIG. 10 is a method flowchart of a calibration method 80 according to an embodiment of the present disclosure. If approximately the same result can be obtained, the present disclosure is not limited to be performed according exactly to steps of the flow shown in FIG. 10. The calibration method 80 may be applied to the mobile robot 60 shown in FIG. 1A. Subsequent embodiments will be illustrated using FIG. 1A as an example. In some embodiments, the steps of the calibration method 80 may be performed by different control units/processing units in a processor 503 or the same control unit/processing unit. In some embodiments, the calibration method 80 may include step 81, step 82, step 83, and step 84. In some embodiments, step 81, step 82, and step 83 are the same as step 11, step 12, and step 13 of the calibration method 10. Details will be omitted for tidiness.

In some embodiments, in step 84, the processor 503 may perform calibration result verification according to the keyframe point cloud pose a, the odometer pose β, and the calibration result (i.e, the transformation matrix X).

Figure 11A:
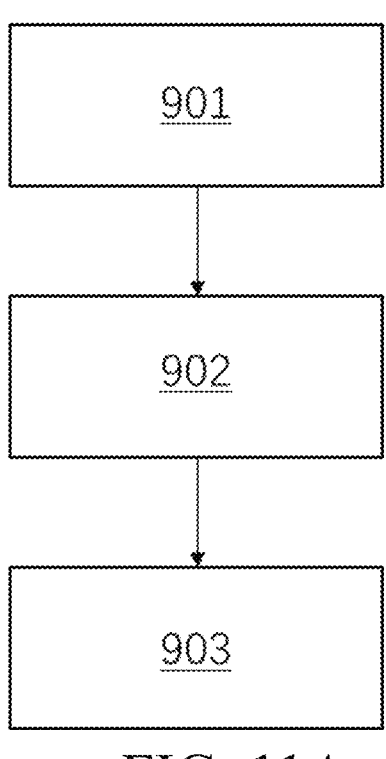
FIG. 11A is a detailed method flow of step 84 according to an embodiment of the present disclosure.

For a detailed explanation of step 84, refer to FIG. 11A. FIG. 11A is a detailed method flow of step 84 according to an embodiment of the present disclosure. If approximately the same result can be obtained, the present disclosure is not limited to be performed according exactly to steps of the flow shown in FIG. 11A. In some embodiments, step 84 may include step 901, step 902, and step 903.

In some embodiments, in step 901, the processor 503 may convert the odometer pose β to a coordinate system of the 3D laser sensor 5021 through the calibration result (i.e. the transformation matrix X). In some embodiments, in step 902, the processor 503 may apply the converted odometer pose β to point cloud data of the 3D laser sensor 5021. In some embodiments, in step 903, the processor 503 may check whether a point cloud overlaps an actual result in an environment, so as to complete the calibration result verification. In some embodiments, the processor 503 may calculates a translation error through a Euclidean distance of two points, and then calculate a rotation error through a difference between rotation matrixes of two frames. If the translation error and the rotation error are both less than a preset threshold, the processor 503 determines that an overlap degree is qualified. It should be noted that the present disclosure does not limit a determining method for the overlap degree.

In other embodiment, the keyframe point cloud pose a may be converted to a coordinate system of the odometer 5022. This is not a limitation on the present disclosure.

Figure 11B:
FIG. 11B is a detailed method flow of step 84 according to another embodiment of the present disclosure.
Figure 11B:
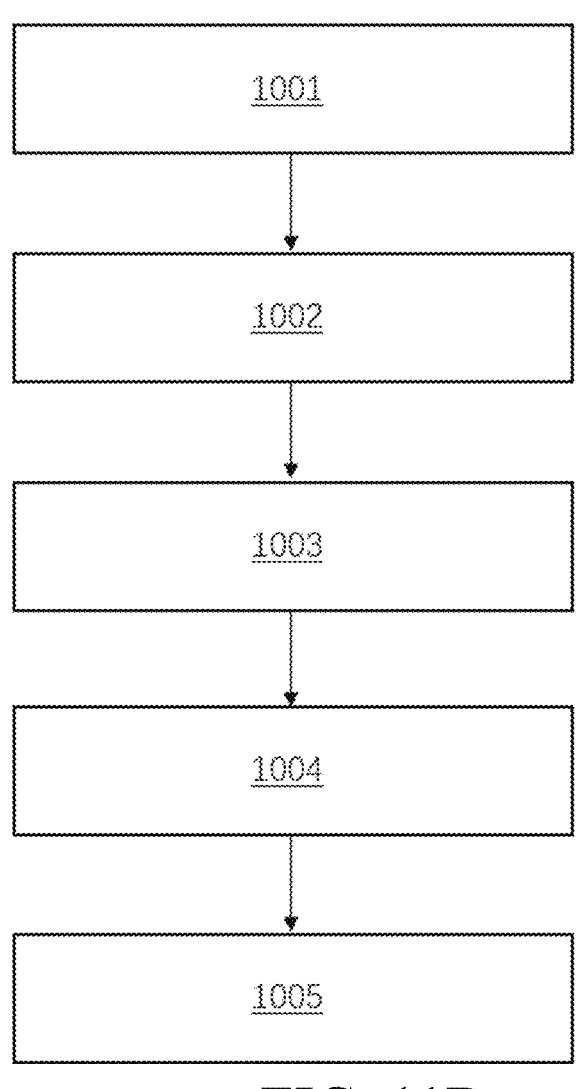

For a detailed explanation of step 84, further refer to FIG. 11B. FIG. 11B is a detailed method flow of step 84 according to another embodiment of the present disclosure. If approximately the same result can be obtained, the present disclosure is not limited to be performed according exactly to steps of the flow shown in FIG. 11B. In some embodiments, step 84 may include step 1001, step 1002, step 1003, step 1004, and step 1005.

In some embodiments, in step 1001, the processor 503 may load verification movement trajectory X3 from the memory 501 to perform automatic task verification. In some embodiments, verification movement trajectory X3 is a movement trajectory that includes a straight line section, a turning direction, and two heading directions. In some embodiments, in step 1002, the processor 503 may drive the mobile robot 60 to move according to verification movement trajectory X3. In some embodiments, in step 1003, the processor 503 may obtain a verification odometer pose B' from the sensor assembly 502, and store the verification odometer pose B' into the memory 501. In some embodiments, in step 1004, the processor 503 may convert the verification odometer pose β' to a coordinate system of the 3D laser sensor 5021 through the calibration result (i.e, the transformation matrix X), to obtain an actual movement trajectory. In some embodiments, in step 1005, the processor 503 may compare the actual movement trajectory with verification movement trajectory X3 to complete the calibration result verification.

Figure 12:
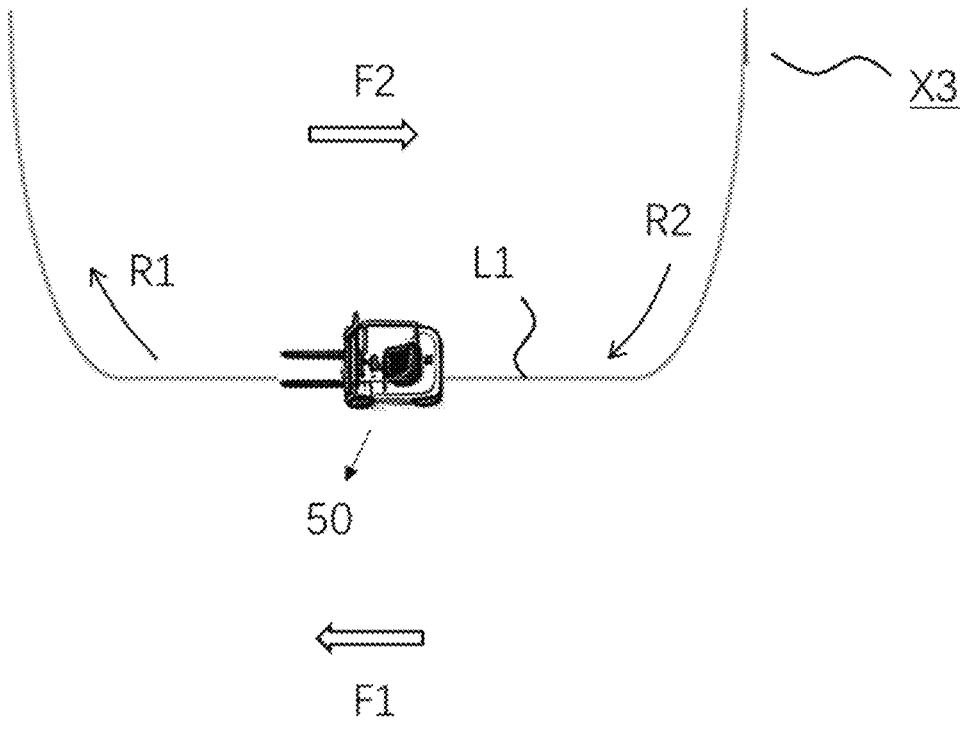
FIG. 12 is a schematic diagram of step 1002 according to an embodiment of the present disclosure.

For a detailed explanation of step 1002, refer to FIG. 12. FIG. 12 is a schematic diagram of step 1002 according to an embodiment of the present disclosure. In some embodiments, verification movement trajectory X3 includes a straight line section L1, turning directions R1 and R2, and two heading directions F1 and F2. The processor 503 drives the mobile robot 60 to move according to verification movement trajectory X3.

In some embodiments, for step 1005, the processor 503 may compare the actual movement trajectory with verification movement trajectory X3 through a torsion degree and inclination degree of the movement trajectory of the mobile robot 60.

In the calibration method 10 and the calibration method 80 which are provided in the present disclosure, the mobile robot 60 is driven to move according to the preset movement trajectory which is simple and highly repetitive. Therefore, it is not easy for the mobile robot 60 to derail, and high-accuracy calibration can be achieved. In addition, the calibration method 10 and the calibration method 80 may be implemented by virtue of the sensor assembly 502 and the processor 503, and the preset movement trajectory may be stored in the memory in advance. Therefore, it can be easy to implement off-line calibration on the mobile robot 60, without additionally configuring an expensive device, so that the costs are reduced, and the difficulties in the background section are effectively solved.

As used herein, the terms "approximately", "basically", "basic", and "about" are used to describe and consider small changes. When used in conjunction with an event or situation, the term can refer to examples of events or situations occurring precisely and examples of events or situations occurring very approximately. As used herein relative to a given value or range, the term "about" generally means within ±10%, ±5%, ±1%, or ±0.5% of the given value or range. The range can be represented herein as from one end point to another end point or between two end points. Unless otherwise specified, all scopes disclosed herein include end points. The term "basically coplanar" can refer to two surfaces located along the same plane within a few micrometers (μm), for example, located along the same plane within 10 μm, 5 μm, 1 μm, or 0.5 μm. When values or characteristics are "basically" the same, the term can refer to values within ±10%, ±5%, ±1%, or ±0.5% of an average value of the values mentioned.

As used herein, the terms "approximately", "basically", "basic", and "about" are used to describe and explain small changes. When used in conjunction with an event or situation, the term can refer to examples of events or situations occurring precisely and examples of events or situations occurring very approximately. For example, when used in conjunction with a value, the term can refer to a change range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to +0.1%, or less than or equal to ±0.05%. For example, if a difference between two values is less than or equal to ±10% of an average value of the values (for example, less than or equal to +5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values can be considered as being "basically" or "approximately" the same. For example, being "basically" parallel can refer to an angle change range less than or equal to ±10° relative to 0°, for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, being "basically" perpendicular can refer to an angle change range less than or equal to ±10° relative to 90°, for example, less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

For example, if a displacement between two surfaces is equal to or less than 5 μm, equal to or less than 2 μm, equal to or less than 1 μm, or equal to or less than 0.5 μm, the two surfaces can be considered as being coplanar or basically coplanar. If a displacement between any two points on a surface relative to a plane is equal to or less than 5 μm, equal to or less than 2 μm, equal to or less than 1 μm, or equal to or less than 0.5 μm, the surface can be considered as being a plane or basically a plane.

As used herein, the singular terms "a/an" and "the" may include plural indicators unless the context otherwise specifies. In some embodiments, an assembly being "on" or "above" another assembly may cover a situation where the previous assembly is directly on the latter assembly (for example, in physical contact with the latter assembly), and a situation where one or more intermediate assemblies are located between the previous assembly and the latter assembly.

As used herein, for ease of description, spatial relative terms such as "below", "under", "beneath", "above", "upper part", "lower part", "left side", "right side", and the like can be used herein to describe a relationship between one assembly or feature and another assembly or feature as illustrated in the figure. In addition to the orientations depicted in the figures, the spatial relative terms are intended to encompass different orientations of devices in use or operation. Equipment can be oriented in other ways (rotated 90 degrees or in other orientations), and the spatial relative descriptors used herein can also be explained correspondingly. It should be understood that when an assembly is referred to as "connected to" or "coupled to" another assembly, it can be directly connected or coupled to another assembly, or there can be an intermediate assembly.

The previous text provides an overview of several embodiments and detailed features of the present disclosure. The embodiments described in the present disclosure can be easily used as a basis for designing or modifying other processes, as well as structures for performing the same or similar purposes and/or obtaining the same or similar advantages of the embodiments introduced herein. These equivalent constructions do not depart from the spirit and scope of the present disclosure, and different changes, substitutions, and changes can be made without departing from the spirit and scope of the present disclosure.

We claim:

1. A calibration method applied to a mobile robot, comprising:

driving the mobile robot to perform a corresponding preset movement task according to at least one preset movement trajectory;

during performing the corresponding preset movement task according to the at least one preset movement trajectory, determining, while the mobile robot is in motion, in response to the mobile robot performing the corresponding preset movement task, whether sensing information of a sensor assembly satisfies a preset condition; and performing body coordinate calibration on the sensor assembly and the mobile robot in response to the sensing information of the sensor assembly satisfying the preset condition;

wherein the sensor assembly at least comprises a 3-dimensional (3D) laser sensor and an odometer; and the preset condition comprises:

determining whether a frame number of a keyframe point cloud pose sensed by the 3D laser sensor and a frame number of an odometer pose sensed by the odometer are greater than a threshold; and wherein the performing body coordinate calibration on the sensor assembly and the mobile robot at least comprises:

obtaining a transformation matrix between at least two sensors in the sensor assembly; and determining an abnormal value in the transformation matrix and discarding the abnormal value to obtain a calibration result;

performing automatic task verification based on the calibration result and a verification movement trajectory, comprising:

in response to the mobile robot moving according to the verification movement trajectory, loading a verification odometer pose sensed by an odometer.

2. The calibration method according to claim 1, wherein the driving the mobile robot to perform the corresponding preset movement task according to at least one preset movement trajectory comprises:

loading the at least one preset movement trajectory;

driving the mobile robot moving according to the at least one preset movement trajectory; and in response to the mobile robot moving according to the at least one preset movement trajectory, driving the sensor assembly to build a map, and obtaining the sensing information.

3. The calibration method according to claim 2, wherein the at least one preset movement trajectory is built in real time by a user.

4. The calibration method according to claim 2, wherein the at least one preset movement trajectory is pre-built when the mobile robot leaves a factory, and is stored in a memory.

5. The calibration method according to claim 2, wherein the at least one preset movement trajectory is loaded by an external processing system arranged outside the mobile robot.

6. The calibration method according to claim 1, wherein the obtaining a transformation matrix between at least two sensors in the sensor assembly comprises:

obtaining and saving the keyframe point cloud pose and the odometer pose.

7. The calibration method according to claim 6, wherein the obtaining a transformation matrix between at least two sensors in the sensor assembly further comprises:

setting an initial calibration value; and calculating the transformation matrix between the 3D laser sensor and the odometer based on the initial calibration value, the keyframe point cloud pose, and the odometer pose.

8. The calibration method according to claim 7, wherein the initial calibration value is determined based on the 3D laser sensor and a body center of the mobile robot when the mobile robot leaves the factory.

9. The calibration method according to claim 7, wherein the calculating the transformation matrix between the 3D laser sensor and the odometer based on the initial calibration value, the keyframe point cloud pose, and the odometer pose comprises:

loading keyframe point cloud poses and odometer poses for all frames.

10. The calibration method according to claim 9, wherein the calculating the transformation matrix between the 3D laser sensor and the odometer based on the initial calibration value, the keyframe point cloud pose, and the odometer pose further comprises:

performing hand-eye calibration on the keyframe point cloud poses and odometer poses of all the frames to obtain the transformation matrix between the 3D laser sensor and the odometer.

11. The calibration method according to claim 10, wherein the determining an abnormal value in the transformation matrix and discarding the abnormal value comprises:

performing abnormal calibration value discarding algorithm on the transformation matrix between the 3D laser sensor and the odometer, to obtain a calibration result.

12. The calibration method according to claim 11, further comprising:

performing overlap degree verification based on the calibration result, the keyframe point cloud poses, and the odometer poses.

13. The calibration method according to claim 12, wherein the performing overlap degree verification based on the calibration result, the keyframe point cloud pose, and the odometer pose comprises:

converting the odometer pose to a coordinate system of the 3D laser sensor through the calibration result; and applying the converted odometer pose to point cloud data of the 3D laser sensor, and checking whether a point cloud overlaps an actual result in an environment to complete the overlap degree verification.

14. The calibration method according to claim 1, wherein the performing automatic task verification based on the calibration result and a verification movement trajectory further comprises:

converting the verification odometer pose into a coordinate of the 3D laser sensor through the calibration result, to obtain an actual movement trajectory; and comparing the actual movement trajectory with the verification movement trajectory to complete the automatic task verification.

15. A controller, configured to perform the calibration method according to claim 1.

16. A mobile robot, configured to perform the calibration method according to claim 1.

\* \* \* \* \*